United States Patent Office.

ADOLF CLEMM, OF MANNHEIM, GERMANY.

METHOD OF MAKING SULFATES AND CHLORIN.

SPECIFICATION forming part of Letters Patent No. 689,461, dated December 24, 1901.

Application filed October 7, 1899. Serial No. 732,879. (No specimens.)

*To all whom it may concern:*

Be it known that I, ADOLF CLEMM, a subject of the Emperor of Germany, and a resident of Mannheim, Germany, have invented certain new and useful Improvements in the Manufacture of Sulfates and Chlorin, of which the following is a specification.

When anhydrous sulfurous acid along with dried oxygen or air is passed over chlorids roasted above their melting-point under proper conditions, sulfates are produced and chlorin is liberated. The action which takes place in the case of sodium chlorid, for instance, is represented by the equation:

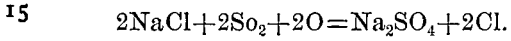
$$2NaCl + 2SO_2 + 2O = Na_2SO_4 + 2Cl.$$

In order to approach this result most nearly, it is necessary to have a continuous excess of oxygen or air and by carrying out the operation at a low speed and offering the largest possible surface to the acid gases to give the fullest opportunities for the production of sulfates and chlorin in point of both time and space. In order to convert the chlorid—for instance, sodium chlorid—into the corresponding sulfate and chlorin, I cause sulfurous acid warmed by the heat generated in its production or by artificial means, together with oxygen or air, to act directly on the red-hot chlorid, whereby the corresponding sulfate and chlorin are obtained if the operation proceeds slowly. Since chlorids easily melt at a red heat, unfavorably influencing the course of the action, I add to the chlorid a small percentage of moist clay in order to check the fusion and then dry the paste after molding it in suitable forms, a porous mixture being thus obtained eminently suitable for the action in view. Substances of similar nature can be used instead of clay.

In order to purify the liberated chlorin from the oxychlorids of sulfur produced, it may be passed before use through concentrated sulfuric acid or even through water.

The sulfates obtained can be used either directly or be brought into suitable form by dissolution and crystallization or in any other convenient manner.

Mixtures of different chlorids can also be used in the process.

Ready-prepared sulfuric anhydrid with oxygen or air can be used in the process instead of a mixture of sulfurous acid and oxygen or air.

I claim—

1. The method substantially as herein described of manufacturing sulfates and chlorin, which consists in first mixing chlorids with clay, adding sufficient water to the mixture to obtain a plastic mass, forming balls from the mass, drying said balls, and heating the dried balls above the melting-point of the chlorids while at the same time subjecting them to the action of sulfurous acid and oxygen.

2. The method substantially as herein described of manufacturing sulfates and chlorin, which consists in first mixing chlorids with clay, adding sufficient water to the mixture to obtain a plastic mass, forming balls from the mass, drying said balls, and heating the dried balls above the melting-point of the chlorids while at the same time subjecting them to the action of sulfuric anhydrid and oxygen.

In testimony whereof I have signed my name to this specification in the presence of two subscribing witnesses.

ADOLF CLEMM.

Witnesses:
F. ADRIAN,
H. VOGELGESAU.